US010584641B2

(12) United States Patent
Escure et al.

(10) Patent No.: US 10,584,641 B2
(45) Date of Patent: Mar. 10, 2020

(54) TURBINE ENGINE WITH A PAIR OF CONTRAROTATING PROPELLERS PLACED UPSTREAM OF THE GAS GENERATOR

(71) Applicant: SAFRAN AIRCRAFT ENGINES, Paris (FR)

(72) Inventors: Didier Rene Andre Escure, Moissy-Cramayel (FR); Jean-Francois Endy Bersot, Moissy-Cramayel (FR); Tewfik Boudebiza, Moissy-Cramayel (FR); Gilles Alain Charier, Moissy-Cramayel (FR); Thomas Julien Nguyen Van, Moissy-Cramayel (FR); Jean Philippe Pierre-Alain Reigner, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 317 days.

(21) Appl. No.: 15/566,861

(22) PCT Filed: Apr. 14, 2016

(86) PCT No.: PCT/FR2016/050874
§ 371 (c)(1),
(2) Date: Oct. 16, 2017

(87) PCT Pub. No.: WO2016/166487
PCT Pub. Date: Oct. 20, 2016

(65) Prior Publication Data
US 2018/0128183 A1  May 10, 2018

(30) Foreign Application Priority Data

Apr. 17, 2015 (FR) ....................................... 15 53470
Apr. 17, 2015 (FR) ....................................... 15 53471

(51) Int. Cl.
*F02C 7/36* (2006.01)
*B64D 35/06* (2006.01)
(Continued)

(52) U.S. Cl.
CPC ................ *F02C 7/36* (2013.01); *B64D 27/10* (2013.01); *B64D 35/06* (2013.01); *F02C 3/067* (2013.01);
(Continued)

(58) Field of Classification Search
CPC ... B64C 11/48; B64D 2027/005; B64D 35/06; F02C 3/067; F02K 3/072; F05D 2220/324; F05D 2220/325
See application file for complete search history.

(56) References Cited

U.S. PATENT DOCUMENTS 2,494,368 A * 1/1950 Steele .................... B64D 35/06
244/1 A
2,518,841 A 8/1950 Vincent
(Continued)

FOREIGN PATENT DOCUMENTS

CN  102257260 A  11/2011
EP  2774852 A2  9/2014
(Continued)

OTHER PUBLICATIONS

Office Action received for Chinese Patent Application No. 201680023773.9, dated Jan. 3, 2019, 9 pages (2 pages of English Translation and 7 pages of Office Action).
(Continued)

*Primary Examiner* — Scott J Walthour
(74) *Attorney, Agent, or Firm* — Womble Bond Dickinson (US) LLP

(57) ABSTRACT

Engine comprising a propeller unit with a pair of contrarotating propellers (31, 32), a gas generator (5) supplying a
(Continued)

power turbine (53), the pair of propellers being rotationally driven by the shaft (53A) of the power turbine via a speed reduction gearbox, the axis of rotation (XX) of the pair of propellers not being coaxial with that (YY) of the power turbine, the speed reduction gearbox comprising a differential gearset (7) and a first stage (6) comprising a simple gearset connecting the turbine shaft (53A) and the differential gearset (7), the engine air intake comprising an air intake duct (11), the air intake duct (11) being in the shape of a lobe adjacent to the assembly formed by the simple gearset and the differential gearset (7).

14 Claims, 4 Drawing Sheets

(51) Int. Cl.
*B64D 27/10* (2006.01)
*F02C 3/067* (2006.01)
*F02C 3/04* (2006.01)
*F02C 7/04* (2006.01)

(52) U.S. Cl.
CPC .................. *F02C 3/04* (2013.01); *F02C 7/04* (2013.01); *F05D 2220/323* (2013.01); *F05D 2220/324* (2013.01); *F05D 2250/34* (2013.01); *F05D 2260/4031* (2013.01); *F05D 2260/40311* (2013.01); *Y02T 50/671* (2013.01)

(56) References Cited

U.S. PATENT DOCUMENTS

| | | | |
|---|---|---|---|
| 4,817,382 | A | 4/1989 | Rudolph et al. |
| 2010/0155526 | A1 | 6/2010 | Negulescu |
| 2011/0274547 | A1 | 11/2011 | Morgan |
| 2013/0039759 | A1* | 2/2013 | Perkinson ............. B64C 11/306 416/1 |
| 2013/0039764 | A1 | 2/2013 | Perkinson |
| 2013/0045102 | A1 | 2/2013 | Gallet et al. |
| 2014/0252159 | A1* | 9/2014 | Stretton ................ B64D 27/14 244/54 |

FOREIGN PATENT DOCUMENTS

| | | |
|---|---|---|
| FR | 2951502 A1 | 4/2011 |
| FR | 2998867 A1 | 6/2014 |
| FR | 3001264 A1 | 7/2014 |

OTHER PUBLICATIONS

International Preliminary Report on Patentability received for PCT Patent Application No. PCT/FR2016/050874, dated Oct. 26, 2017, 17 pages (10 pages of English Translation and 7 pages of Original Document).

International Search Report and Written Opinion in PCT/FR2016/050874 dated Sep. 8, 2016.

* cited by examiner

TURBINE ENGINE WITH A PAIR OF CONTRAROTATING PROPELLERS PLACED UPSTREAM OF THE GAS GENERATOR

TECHNICAL FIELD

The present invention relates to the field of aeronautic propulsion. It concerns an engine with a pair of propellers driven by a gas turbine engine.

PRIOR ART

Engines with pairs of propellers are denoted in the field by the terms "open rotor" or "unducted fan" engine. They differ from multi-flow turbojet engines in the use of a propeller instead of a fan. This is formed, furthermore, of two contra-rotating coaxial propellers. These engines are developed on the basis of a design in which the propellers are either behind the gas generator and denoted "pushers", or in front of it and denoted "pullers". The invention relates particularly to an engine of the latter type.

For this case, the prior art shows that the propellers, forming the propeller unit, and the gas generator are coaxial, in line with one another. The engine is said to be in-line.

Several elements or parameters should be taken into consideration when adopting a design according to this layout, such as the drive mode of the propeller unit formed of the two propellers, the hub ratio of the propellers and the arrangement of the air intake duct.

The propellers are driven by the power turbine coupled to the gas generator, rotating faster than the propellers, by means of a differential reduction gear. The speeds, torque ratio and ratio between the speeds of the contra-rotating propellers of an open rotor derive from aeroacoustic optimisation. For a differential reduction gear, the torque ratio between the propellers depends on the reduction ratio—generally a reduction ratio of between 7.5 and 12. The mass of the differential transmission is linked to the size of the wheels. For a given ratio, some limited adjustment of the teeth module is possible, so there is a limited number of configurations, far removed from the desired ratio and/or optimised mass.

The selected power turbine speed is a consequence of combining the reduction ratio and the propeller speeds and may not be compatible with the objective of service life or may lead to a suboptimal turbine because of high mass. Conversely, complying with this specification may lead to a suboptimal aeroacoustic situation in the absence of an additional degree of freedom when the engine characteristics are defined.

Reducing the propeller/hub ratio—the ratio between the diameter of the hub and that of the propellers—is favourable in terms of engine performance or mass.

With identical diameters, this means that the aerodynamic load of the propellers can be reduced and, consequently, the efficiency increased.

With identical aerodynamic loads, it means that the diameter of the propellers can be reduced and, consequently, the mass reduced.

The air intake can be arranged in various ways.

The air intake of the engine can be arranged upstream of the propellers with a central opening and an annular channel between the hub and a ring supporting the propeller blades, as illustrated in patent application FR 2951502 in the name of the applicant. However, the presence of rotating arms in the air intake channel leads to a pressure drop, which unfavourably affects the performance of the gas generator.

The air intake can be arranged between the two propellers in the shape of an annular channel. Patent applications FR 2998867 and FR 3001264 in the name of the applicant represent an example of the same, see FIG. 1. However, where the annular channel has a large radius, being on the periphery of the engine, there is little opening height available. This results in a significant boundary layer thickness, which is unfavourable in terms of efficiency. What is more, the air flow admitted is subject to distortion phenomena in the case of sideslip or where the aircraft has a large angle of attack. Finally, this arrangement means that the downstream propeller has an increased hub ratio, which is unfavourable in terms of mass and performance.

The air intake can be arranged behind the propellers and have an annular or bi-lobed shape. With an annular shape, the same aerodynamic impact is found as previously. With a bi-lobed shape, there is the benefit of greater opening height, which therefore favours efficiency; however, greater distortion of flow is noted in the case of sideslip, which affects the operability of the gas generator compressor.

The air intake can be arranged behind the propellers and have a single-lobed shape. This makes it possible to increase the height of the air stream and avoid the aerodynamic problems encountered in the other solutions but this arrangement imposes a certain aerodynamic profile, which requires a significantly longer engine in order to accommodate a reduction gear. The air intake allows the differential transmission to be bypassed but its size depends on the radius of the differential transmission ring. This lengthening comes at the expense of mass, and causes distortion of the framework and poorer performance.

In a design including a propeller unit with a pair of upstream propellers, it is also important to pay attention to the arrangement of services. Each propeller, being variable-pitch type, includes a mechanism for varying the blade pitch with a pivot rotation drive actuator. It has to be possible to supply the various upstream actuators with fluid and electrical services. These services must be routed from a stationary marker, linked to the structural casing, towards a rotating marker on the propellers. In particular, fluid supplied must pass through an oil transfer system that generates a great deal of leakage. What is more, routing the electrical services from a stationary marker towards a rotating marker requires the installation of a rotating transformer. Finally, it is also desirable not to have to cross an air stream because of the pressure drops that are caused.

The present applicant has set the first objective of producing an engine with a pair of upstream propellers, in which the power transmission between the power turbine and the pair of propellers makes it easy to adapt a speed reduction gear mechanism to the turbine driving it.

A second objective relates to an engine with an air intake that is both insensitive to variations in angle of attack of the aircraft and results in the lowest possible pressure drop.

Another objective relates to the production of an engine in which the arrangement of the propeller unit allows a low hub ratio.

Another objective relates to the optimal arrangement of the services supplying the mechanisms for changing the pitch of the propeller blades.

Another objective is to produce an engine with an air intake that is both insensitive to variations in angle of attack of the aircraft and results in the lowest possible pressure drop for the shortest possible engine length.

SUMMARY OF THE INVENTION

These objectives are achieved, according to the invention, with an engine comprising a pair of contrarotating propellers, a gas generator supplying a power turbine, the pair of propellers being rotationally driven by the shaft of the power turbine via a speed reduction gearbox, the axis of rotation of the pair of propellers not being coaxial with that of the power turbine, the speed reduction gearbox comprising a differential gearset and a first stage comprising a simple gearset connecting the turbine shaft and the differential gearset, the engine air intake comprising an air intake duct, the air intake duct being in the shape of a lobe adjacent to the assembly formed by the simple gearset and the differential gearset.

Thus, by combining offset shafts and an air intake duct adjacent to the speed reduction gear:

Access conditions for maintaining the major modules, i.e. the gas generator and the propeller unit, are improved.

The offset single-lobed air intake allows improved aerodynamic performance of the air intake and easy incorporation of a particulate trap.

Integration of the external configuration is easier; the engine has more space in which to house the equipment (AGB, pump etc.) which in any case, is arranged in a cool portion.

It is possible to install the turboprop-type engine, with the advantage—over an in-line engine—of having more ground clearance, with the same propeller diameter.

The large-diameter rotating casings included in other engine designs can be dispensed with, since there is no air stream passing through the hub. This leads to a substantial reduction in mass.

The engine is shorter than in-line engines—in as much as at least 80% of the overall axial dimensions of the transmission is taken up by the overall dimensions of the air intake duct—while the constraint of maintaining low air deflection between the intake duct and the compressor intake is respected. This results in a saving in weight.

The assembly formed by the simple gearset and the differential gearset is preferably located on the same side of the air intake duct, for instance above the air intake duct when the engine is in the operational configuration.

The first stage with a simple gearset can comprise a first toothed wheel, integral with the turbine shaft, said first toothed wheel meshing with a second toothed wheel of the first stage, said second toothed wheel being mounted so as to rotate about the axis of the pair of propellers. The first toothed wheel preferably meshes directly with the second toothed wheel, with no intermediate element between the first and second toothed wheels.

The assembly formed by the simple gearset and the differential gearset is preferably located, for instance in line with the engine, between the pair of propellers and the gas generator. In particular, the assembly formed by the simple gearset and the differential gearset can be located downstream of the downstream propeller and upstream of the gas generator.

The angle between the axis of the power turbine and the straight line connecting the apex of the compressor of the gas generator to the inner elbow of the air intake duct is preferably between 20 and 60°.

The differential gearset can comprise an intake on the side of the power turbine and two outlets, each driving a propeller rotor.

According to another characteristic, the first stage comprises a wheel connected to a planetary gear of the differential gearset.

Through this characteristic, the invention:

offers an additional degree of freedom when it comes to determining the propeller speeds and torques relative to the power turbine. Indeed, in a differential transmission, the torque ratio between the two outlets is linked to the intake/outlet reduction ratio. With this additional stage, it is possible to optimise the characteristics of the power turbine. A fast power turbine has a lower mass since its mean radius can be reduced and it is also easier to integrate. This additional stage also offers greater liberty to reduce the mass of the differential. To this end, several solutions can be explored and combined: increasing the reduction ratio so as to reduce the diameter of the central planet gear, reducing the diameter of the satellites or optimising the overall reduction ratio in order to reduce the total mass of the wheels.

The ratio between the downstream propeller/upstream propeller pairs is fixed by aerodynamic and acoustic parameters so as to achieve optimal propulsion efficiency of the pair of propellers. The overall reduction ratio is different from the reduction ratio of the differential transmission. The aim is to have an overall reduction ratio of between 8 and 15 and a reduction ratio on the differential portion of between 6 and 11. The overall transmission ratio is between 0.5 and 2 of the reduction ratio of the differential transmission. Preferably, a multiplier ratio for the simple gearset is chosen so as to have the gear ratios correlated with the aforementioned torque ratio. In particular, a differential with a greater reduction ratio is desirable, to limit its weight.

In parallel, the simple gearset produces an offset between the axes of the propeller unit and the generator. This offset makes it possible to ensure optimisation of the modularity between the propeller unit and the gas generator, as well as a low propeller hub ratio, which is made possible by the absence of an internal air stream in the propeller unit. It also means that the equipment can be driven directly by the reduction gear, for example a load compressor.

At least one of the differential gearset and the simple gearset can comprise toothed wheels that are duplicated, for instance axially.

The simple gearset can in particular comprise two wheels in parallel meshing with the wheel connected to the planetary gear.

For example, the turbine shaft can be integral with a single toothed wheel that drives two wheels in parallel, engaged with a single wheel coaxial with the planet wheel of the differential, which is duplicated. The two wheels of the planet gear drive the planet wheels, themselves duplicated axially like the ring.

According to one embodiment, the differential gearset comprises a planetary gear, a planet carrier and a ring, the planet carrier being connected to the upstream propeller and the ring to the downstream propeller of the pair of propellers.

According to a variant embodiment, the differential gearset comprises a planetary gear, a planet carrier and a ring, the planet carrier being connected to the downstream propeller and the ring to the upstream propeller of the pair of propellers.

More particularly, according a preferred integrated structure, the engine comprises a fixed structure with a sleeve, a first shaft member being supported via bearings inside the sleeve, said shaft member connecting the ring to one propeller of the pair of propellers.

According to another characteristic, the engine comprises a second shaft member supported via bearings inside the first shaft member, the second shaft member connecting the planet carrier to the other propeller of the pair of propellers.

According to another characteristic, the engine comprises a third shaft member supported via bearings on the fixed structure, said shaft member connecting the first speed-reduction stage to the planetary gear.

Advantageously, the engine comprises a sleeve containing services, housed inside the shaft members. More particularly, this sleeve is fixed.

The invention thus allows the services to be routed into the static marker, and a static actuator to be installed. Such an arrangement is not possible in the case of an in-line design. Furthermore, incorporating a sleeve into the propeller unit, offset from the gas generator, makes for easier access.

DESCRIPTION OF THE FIGURES

It will be easier to understand the invention, and the other aims, details, features and advantages thereof will become clearer on reading the following detailed, explanatory description of an embodiment of the invention given by way of purely illustrative, non-restrictive example, with reference to the accompanying diagrammatic drawings.

In these drawings.

DETAILED DESCRIPTION

Figure 1:
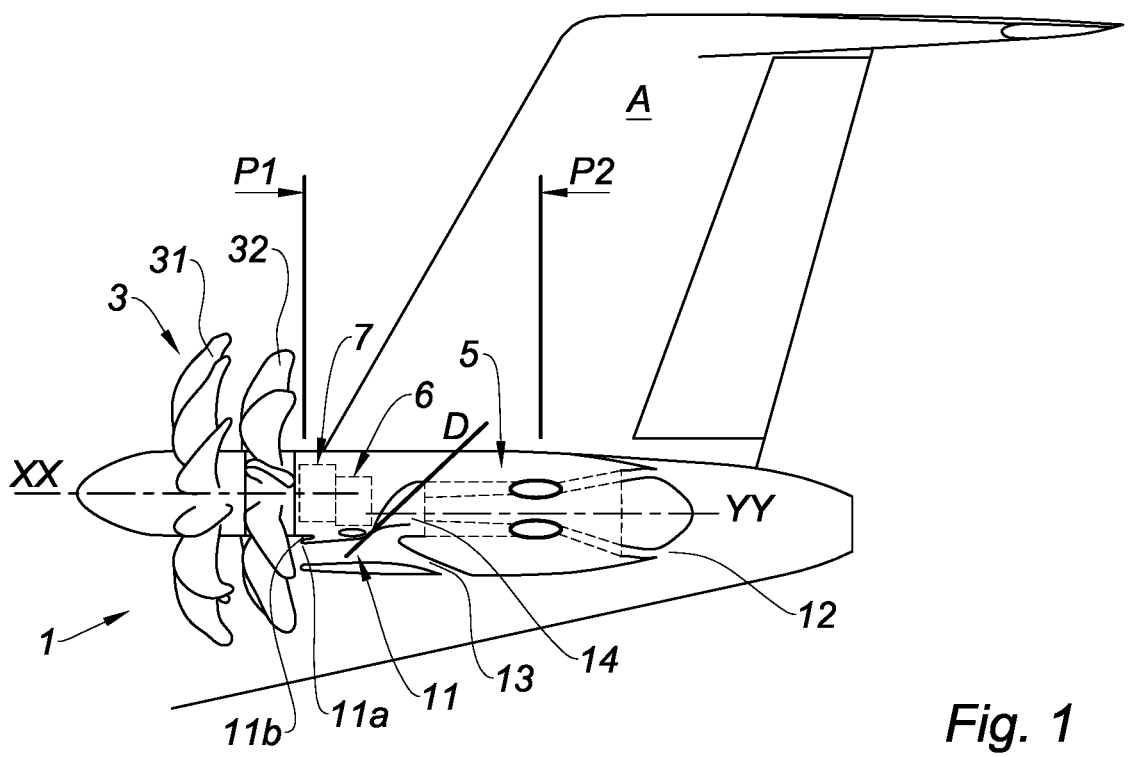
FIG. 1 shows diagrammatically, in axial section, an example of an engine according to the invention.

With reference to FIG. 1, the engine 1 is shown mounted on an aircraft A in the rear portion of the fuselage. It is attached to the latter at two planes of suspension, an upstream plane P1 and a downstream plane P2. It comprises, from upstream to downstream, a propeller unit 3 formed of two contra-rotating propellers, 31 and 32, rotating about an axis XX known as a propeller unit axis. Downstream, a gas generator 5 is formed of a gas turbine engine with a compression assembly, a combustion chamber and a turbine assembly. The gases from the gas generator 5 are ejected into the atmosphere via an exhaust nozzle 12 at the rear of the engine. The shafts of the generator 5 are coaxial and mounted so as to rotate about an axis YY, called the gas generator axis. The axes XX and YY are offset from one another. In relation to position on the aircraft, in FIG. 1, the axis XX is positioned above the axis YY; this means that the distance from the ground to the propeller unit can be increased and an engine can be positioned lower on the aircraft or positioned on an aircraft that needs a lot of ground clearance.

Figure 7:
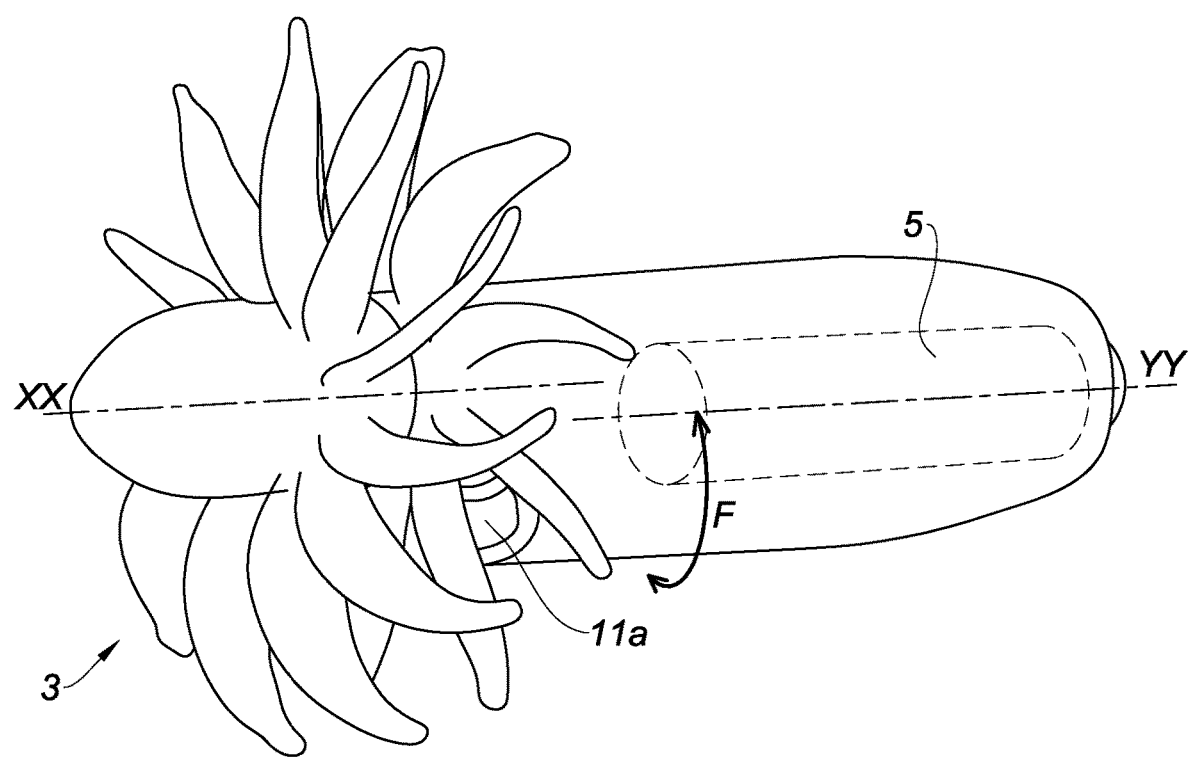
FIG. 7 shows the engine, in perspective, with the positioning of the air intake duct relative to the offset axes.

The offset also allows the engine to be mounted on the aircraft so as to bring the gas generator closer to the fuselage, to limit the overhang of the engine while placing the propellers further away. In this case the axes will instead be at the same height but offset horizontally or else offset in terms of height and horizontally. FIG. 7 shows diagrammatically the engine of the invention with its two axes XX and YY and the air intake duct, the axis of which is coplanar with the first two. The bidirectional arrow F illustrates how the relative position of the axes can be varied relative to each other on the aircraft by pivoting them relative to each other.

Part of the power provided by the gas generator 5 is transmitted by a shaft 53a to the propeller unit. The shaft 53a extends upstream and drives the rotors 31 and 32 of the propeller unit through a speed reducer comprising a differential reduction gear 7 and a first stage 6 with a simple gearset. The gearset is said to be simple since the axes of rotation of the toothed wheels are fixed.

According to this embodiment, the first stage 6, with a simple gearset, comprises a toothed wheel 61 integral with the shaft 53A, meshing with a toothed wheel 63, mounted so as to rotate about the axis XX of the propeller unit. The offset between the axes XX and YY corresponds to the distance between the axes of the two wheels 61 and 63. Depending on the respective radii of the two wheels, this first stage 6 leads to a reduction or increase in rotational speed between the inlet and outlet wheels. The gearset is said to be simple since the axes are fixed, unlike the differential.

The wheel 63 drives the wheels of the differential reduction gear 7. This differential comprises a sun gear 71, a ring 73 and, between the two, the planet gears 72 mounted on the planet carrier 72P. The three members 71, 73 and 72P of the differential and the axis XX are coaxial.

The shafts 31A and 32A of the propeller unit rotors are coaxial with the axis XX and are integral respectively with the planet carrier 72P and the ring 73 of the differential reduction gear.

The outlet wheel 63 of the first reduction stage, via its shaft, drives the shaft of the sun gear 71.

The blade pitch of each of the propellers is controlled by an actuator shown diagrammatically as 31V and 32V respectively. For example, the pitch is changed by driving the blades about their axis with a crank. Patent FR 3001 264 filed by the applicant describes an embodiment of a pitch change control.

The gas generator 5 is housed in a nacelle 10 comprising an air intake duct 11 for supplying the gas generator with air. This air intake duct is adjacent to the reduction gears 6 and 7 with, here, an intake plane 11a perpendicular to the axis XX, and it is arranged so as to direct the air in a direction parallel to XX and then divert it towards the intake of the generator 5. The curvature of the air intake duct makes it possible to incorporate a trap 13 for particulates and foreign objects that might damage the engine.

The simple gearset 6 and the differential gearset 7 are located radially on the same side of the air intake duct 11, above the air intake duct 11. In this way, the axis of the air delivery duct at the intake of the duct 11 is located below the axis YY of the gas generator, which is itself located below the axis XX of the propeller unit.

The deflection of the air stream entering the engine is given by the angle between the axis YY and the straight line D connecting the apex of the gas generator compressor to the inner elbow of the air intake duct. This angle is chosen, according to aerodynamic considerations, to be between 20 and 60° to avoid flow distortion at the compressor intake and penetration of foreign bodies into the engine. This angle is determined according to the compressor, the geometry of the engine and aircraft, etc. The axial dimension of the channel 14 is thus determined from the centre-to-centre distance and this angle. It is therefore desirable to reduce this centre-to-centre distance.

As indicated above, there is now only the radius of the intake wheel to be bypassed, and no longer the radius of the differential ring. Preferably, the radius of the intake wheel is at least twice as small as that of the differential ring. It should be noted that the ring normally has a larger inner toothing and therefore overall dimensions than the outer toothing of the intake wheel of the simple gear unit. It is also necessary to add the oil scavenging device, though this has equivalent overall dimensions in both cases.

It should be noted that the height offset of the axes allows the air duct 11 to be incorporated with a more favourable opening height in terms of pressure drop relative to the annular openings, since the boundary layer in the air intake occupies a relatively small portion thereof compared with fresh air. The width of the duct 11 extends over a portion of a circle, for example 90°.

Furthermore, advantageously, the upstream lip 11*b* of the air intake duct, on the nacelle side, is separated from the latter so as to prevent or, at least, reduce intake of the boundary layer air formed by the flow along the rotating nacelle.

Advantageously too, a device for scavenging the lubrication oil of the reduction gear units is housed in the lower portion of the reduction gear, close to the air intake duct. This scavenge oil is at a sufficient temperature to form a means of de-icing the air duct.

This engine operates as follows. The air is guided by the duct 11 towards the gas generator 5, which supplies appropriate power to drive the power turbine 53. The gases leaving the turbine are ejected through the exhaust nozzle 12.

The shaft 53*a* rotates the wheels of the first stage 6, the rotational speed of the wheel at the outlet, relative to that of the shaft 53*a*, being determined by the reduction or increase ratio defined with the characteristics of the engine.

The outlet wheel of the first stage drives the planet gear of the differential 7, which rotates the planet carrier and the planet wheels supported by the latter. These planet wheels drive the ring in inverse rotation relative to that of the planet gear.

The design of such an engine permits further improvements when developed in several steps. This development comprises:
an aeroacoustic optimisation step in which the absolute value of the torque ratio of the upstream propeller is set at between 0.8 and 1.5 or 2 of the propeller speed. The torque ratio sets the reduction ratio of the differential;
a step of optimising the turbine in which an ideal turbine speed is set depending on the turbine engine parameters, i.e. power, shape of air stream and maximum speed. The overall reduction ratio between the turbine and the propellers is deduced from this. In this way the reduction ratio of the reduction gear is set;
a step of optimising the mass of the reduction gear assembly and the size of offset between the axes XX and YY, in which the torque ratio is varied by +1-10%, to determine a lower mass point.

Figure 2:
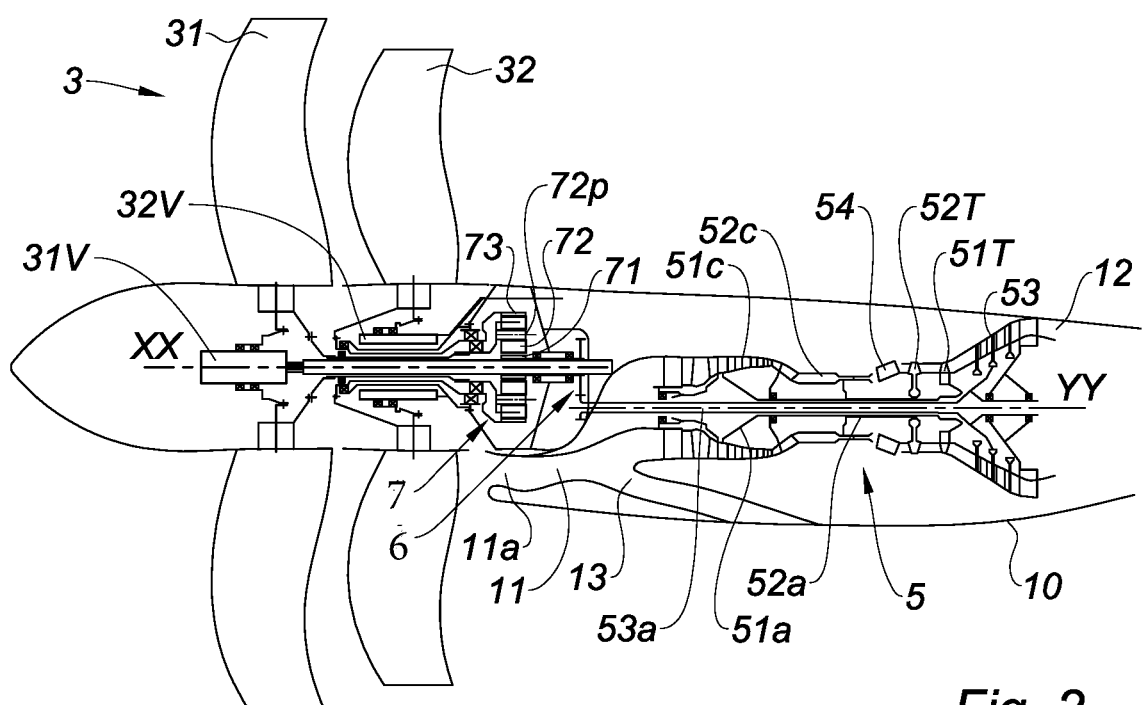
FIG. 2 shows in greater detail the structural members of the embodiment of an engine according to the invention.
Figure 3:
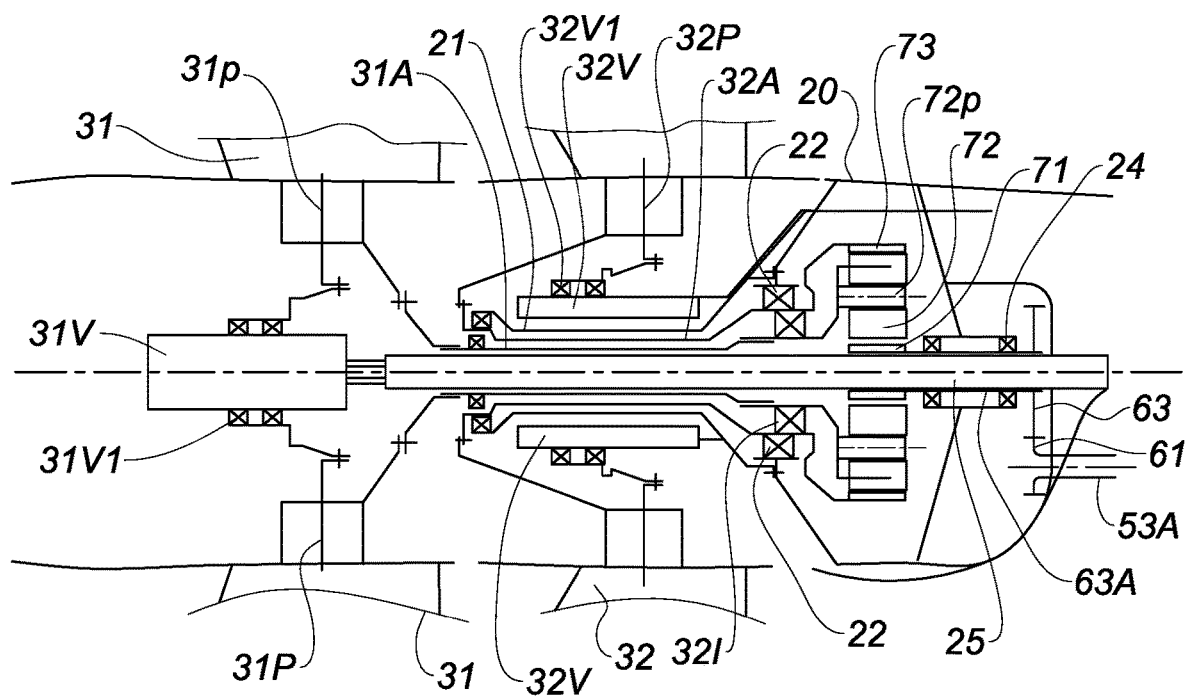
FIG. 3 shows the details of FIG. 2 relating to the propeller unit.

Referring to FIGS. 2 and 3, these show an embodiment of the engine in greater detail.

The gas generator 5 is formed of a gas turbine engine with a compression assembly, a combustion chamber 54 and a turbine assembly. The generator is here formed of three rotors 51, 52, 53. The two rotors 51 and 52 comprise respectively a compressor 51C, 52C and a turbine 51T, 52T, connected by a shaft 51A and 52A. The shafts of the generator 5 are coaxial and mounted so as to rotate about the axis YY. The combustion chamber 54 is positioned between the compressor 52C, a high-pressure compressor, and the turbine 52T, a high-pressure turbine. Downstream of the turbine 51T, which is a low-pressure turbine, a power turbine 53 is mounted on the shaft 53A coaxial with the shafts 51A and 52A.

The combustion chamber 54 is positioned between the compressor 52C, a high-pressure compressor, and the turbine 52T, a high-pressure turbine. Downstream of the turbine 51T, which is a low-pressure turbine, a power turbine 53 is mounted on the shaft 53*a* coaxial with the shafts 51*a* and 52*a*.

According to this embodiment, the first stage 6, with a simple gearset, comprises a toothed wheel 61 integral with the shaft 53*a*, meshing with a toothed wheel 63, mounted so as to rotate about the axis XX of the propeller unit. The offset between the axes XX and YY corresponds to the distance between the axes of the two wheels 61 and 63. Depending on the respective radii of the two wheels, this first stage 6 leads to a reduction or increase in rotational speed between the intake and outlet wheels. The gearset is said to be simple since the axes are fixed, unlike the differential.

The wheel 63 drives the wheels of the differential reduction gear 7. This differential comprises a sun gear 71, a ring 73 and, between the two, the planet gears 72 mounted on the planet carrier 72P. The three members 71, 73 and 72P of the differential and the axis XX are coaxial.

The shafts 31A and 32A of the propeller unit rotors are coaxial with the axis XX and are integral respectively with the planet carrier 72P and the ring 73 of the differential reduction gear.

The outlet wheel 63 of the first reduction stage drives, via its shaft, the shaft of the sun gear 71.

The turbine rotates the wheels of the first reduction stage 6. The rotational speed of the wheel at the outlet relative to that of the shaft 53A is determined by the reduction or increase ratio defined with the characteristics of the engine.

The outlet wheel of the first stage drives the planet gear, which rotates the planet carrier and the planet wheels supported by the latter. These planet wheels drive the ring in inverse rotation relative to that of the planet gear. During flight and on the ground, the blade pitches are adjusted by actuators. The blade pitch of each of the propellers is controlled by an actuator shown diagrammatically as 31V and 32V respectively. For example, the pitch is changed by driving the blades about their axis with a crank. Patent FR 3001 264 filed by the applicant describes an embodiment of a pitch change control.

The diagram in FIG. 2 makes it easier to understand the operation of the engine; FIG. 3 uses the same engine members relating to the propeller unit portion and shows how these are integrated into the structure.

The fixed structure 20 comprises a set of casing members forming bearing supports. In this way, the casing comprises a sleeve 21 extending upstream. This sleeve 21 is coaxial with the shafts 32A and 31A of the two propellers. It supports, via bearings 22, the shaft 32A of the downstream propeller connected to the ring 73 of the differential reduction gear. This shaft 32A is integral at its other end with the propeller hub 32. It should be noted that the sleeve 21 supports the blade pitch control actuator 32V of the downstream propeller 32. To transmit a translation movement of the control member of the fixed actuator 32V, a ring 32*v*1 is mounted with bearings on the actuator control member. This ring is connected to the connecting rods securing the pivot 32*p* of the blades.

The shaft 31A connected to the upstream propeller 31 is supported by the shaft 32A via inter-shaft bearings 321. Downstream, the shaft 31A is attached to the planet carrier 72*p*.

The shaft 63A connecting the toothed wheel of the first stage 6 to the sun gear 71 is supported by a fixed casing member via bearings 24.

A fixed sleeve 25 is housed within the shafts 63A and 31A. It connects the upstream propeller blade pitch control actuator 31V to a zone located downstream of the reduction gears. The function of this sleeve is to act as a guide for the fluid and electrical services for the actuator 31V, for instance. This actuator is fixed and, like the actuator 32V, it transmits movement to the pivots 31P of the upstream propeller blades via a rotary ring.

According to another embodiment the upstream actuator can rotate about the axis XX. An appropriate seal is then provided between the actuator and the sleeve.

Figure 4:
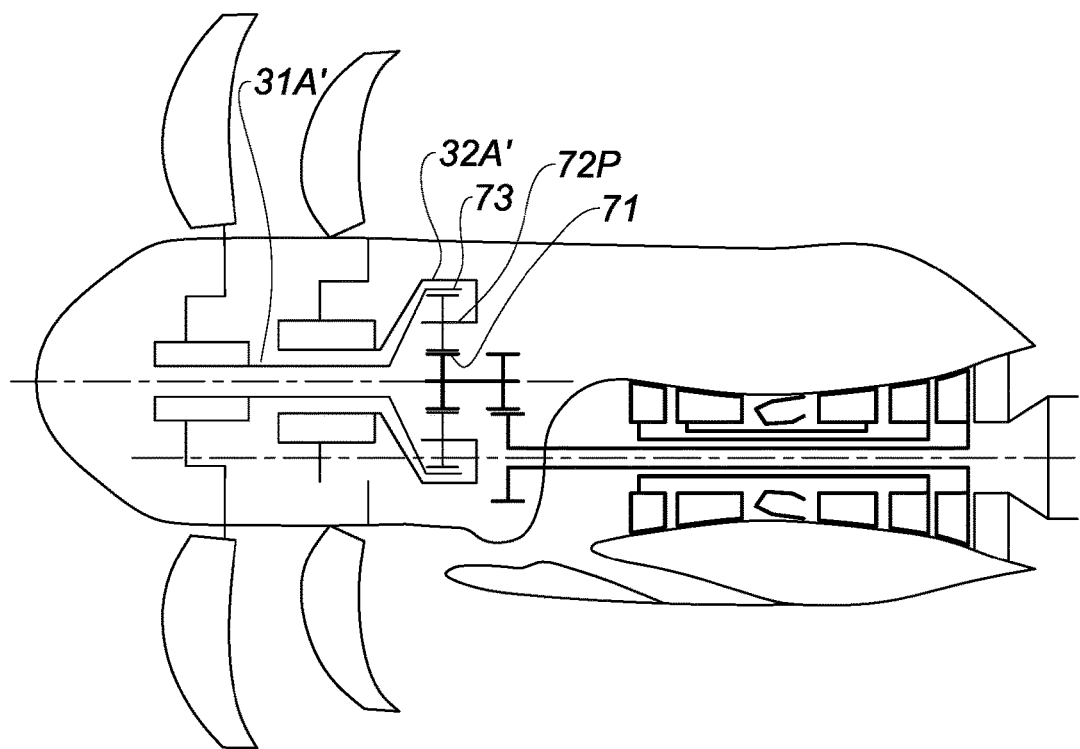
FIG. 4 shows a variant embodiment of the invention.

FIG. 4 shows a variant embodiment where the attachment of the shafts of the two propellers has been modified. The shaft 32A' is arranged so as to be driven by the planet carrier 72P and to drive the downstream propeller in turn. The shaft 31A' is arranged so as to be driven by the ring 73 of the differential reduction gear and to drive the upstream propeller 31.

Figure 5:
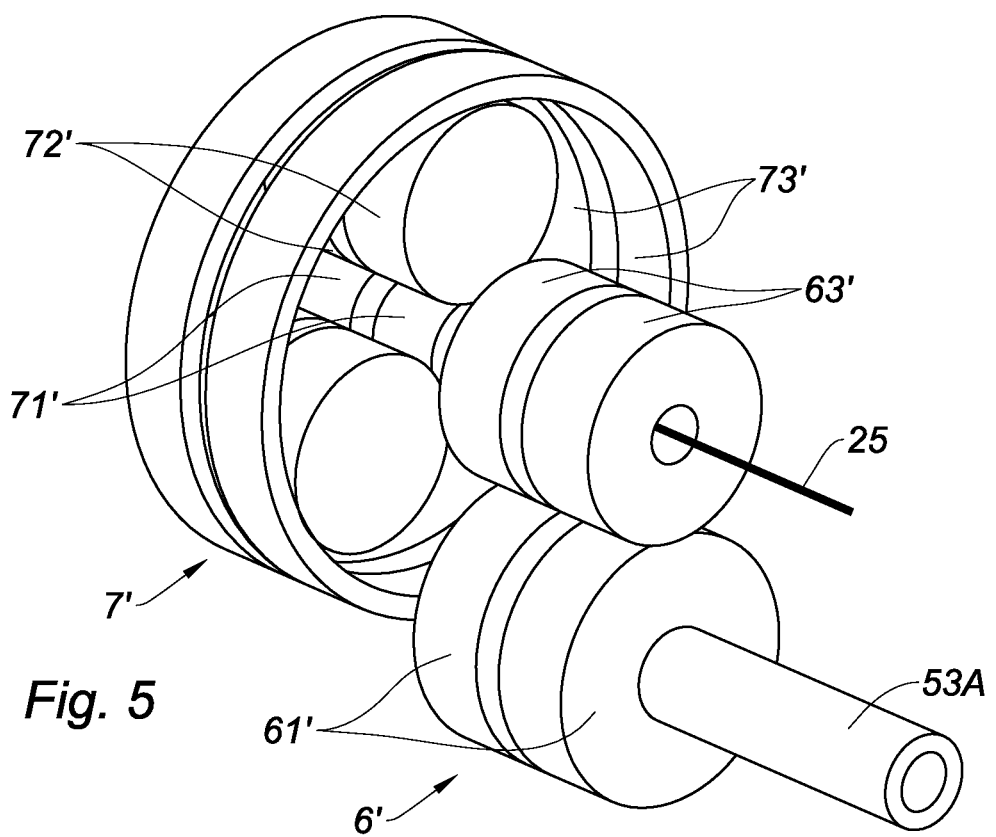
FIG. 5 shows, in a perspective view, an example of a reduction gear with double toothed wheels.

FIG. 5 shows an exemplary embodiment of the first stage with a simple gearset, allowing transmission of a high power density owing to distribution of the effort applied to the toothings over a larger surface area. In this example, the shaft of the turbine 53A is integral with two coaxial toothed wheels 61', which mesh simultaneously with two coaxial toothed wheels 63'. These two wheels 63' are secured to two coaxial wheels 71 forming the planet gear of the differential 7. Similarly, the planet gears 72' are duplicated axially, as is the ring 73'.

This arrangement has the advantage of distributing the torque transmitted between the two duplicated wheels, which limits the load on the toothings without hampering the reduction gear in the lengthwise direction.

Figure 6:
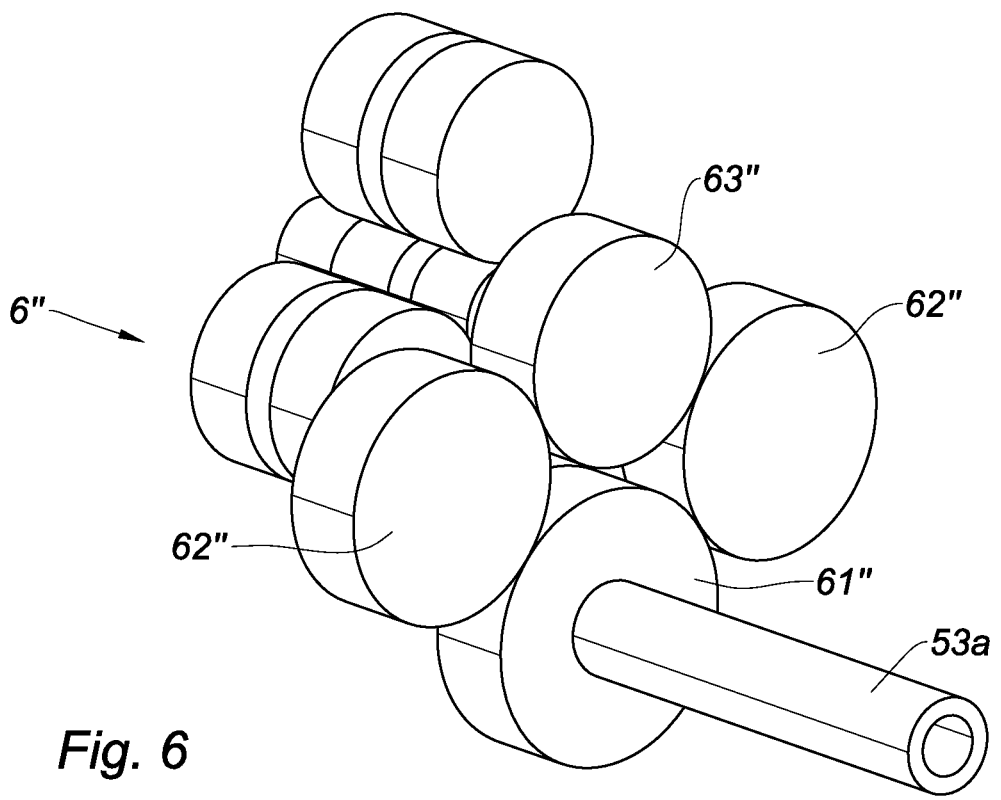
FIG. 6 shows another example of a reduction gear.

FIG. 6 shows a variant embodiment of the reduction gear aimed at the same objective. In this figure the ring of the differential has not been represented. The toothed wheel 61" integral with the shaft 53A can be seen. Here it drives two wheels 62" in parallel. These two wheels are placed in the same transverse plane relative to the shaft 53A and engage with the wheel 63". This wheel is coaxial with the planet wheel of the differential which, as in the previous example, has been duplicated. Similarly, the two wheels of the planet gears drive the planet wheels themselves, duplicated axially like the ring, not represented. This solution allows the axial dimensions of the reduction gear to be reduced without affecting the ability to transmit high torques. The length of the engine, particularly its cantilevered portion, is reduced by the same amount.

A mechanism for equalising torque between the two wheels is, where appropriate, added to this gearset to avoid premature wear on one of the effort paths.

The invention claimed is:

1. An engine comprising:
a propeller unit with a pair of contrarotating propellers;
a power turbine;
a power turbine shaft coupled to the power turbine;
a gas generator configured to supply exhaust gases to the power turbine,
a speed reduction gearbox comprising a differential gearset and a simple gearset, the speed reduction gearbox coupled to the pair of contrarotating propellers and the power turbine shaft such that the power turbine is configured to drive the pair of contrarotating propellers through the speed reduction gearbox, wherein the simple gearset is coupled to the power turbine shaft and the differential gearset; and
an air intake comprising an air intake duct, the air intake duct having a shape of a lobe, the air intake duct being positioned adjacent to the speed reduction gearbox;
wherein an axis of rotation of the pair of contrarotating propellers is not coaxial with an axis of rotation of the power turbine,
wherein the simple gearset comprises a first toothed wheel, the first toothed wheel being integral with the power turbine shaft, said first toothed wheel in meshing engagement with a second toothed wheel of the simple gearset, said second toothed wheel being mounted coaxially with the axis of rotation of the pair of contrarotating propellers.

2. The engine according to claim 1, wherein the simple gearset and the differential gearset are located to one side of the air intake duct.

3. The engine according to claim 1, wherein the simple gearset and the differential gearset are located between the pair of contrarotating propellers and the gas generator.

4. The engine according to claim 1, wherein an angle defined between the axis of rotation of the power turbine and a straight line connecting an apex of a compressor of the gas generator to an inner elbow of the air intake duct is between 20° and 60°.

5. The engine according to claim 1, wherein the second toothed wheel of the simple gearset is coupled to a sun gear of the differential gearset.

6. The engine according to claim 1, wherein at least one of the differential gearset or the simple gearset comprises duplicated toothed wheels.

7. The engine according to claim 6, wherein the simple gearset comprises two toothed wheels in parallel meshing engagement with a toothed wheel connected to a sun gear of the differential gearset.

8. The engine according to claim 1, wherein the differential gearset comprises a sun gear, a planet carrier and a ring, the planet carrier being connected to an upstream propeller of the pair of contrarotating propellers and the ring being connected to a downstream propeller of the pair of contrarotating propellers.

9. The engine according to claim 1, in wherein the differential gearset comprises a sun gear, a planet carrier and a ring, the planet carrier being connected to a downstream propeller of the pair of contrarotating propellers and the ring being connected to an upstream propeller of the pair of contrarotating propellers.

10. The engine according to claim 1, wherein the engine further comprises a fixed structure with a sleeve, a first shaft member being supported via bearings inside the sleeve, said first shaft member connecting a ring of the differential gearset to a first propeller of the pair of contrarotating propellers.

11. The engine according to claim 10, wherein the engine further comprises a second shaft member supported via bearings inside the first shaft member, the second shaft member connecting a planet carrier of the differential gearset to a second propeller of the pair of contrarotating propellers.

12. The engine according to claim 10, wherein the engine further comprises an additional shaft member supported via bearings on the fixed structure, said additional shaft member connecting the second toothed wheel of the simple gearset to a sun gear of the differential gearset.

13. The engine according to claim 8, further comprising a sleeve containing services, the sleeve being housed within an innermost shaft member of a plurality of shaft members.

14. The engine according to claim 1, wherein the sleeve is a fixed sleeve.

* * * * *